United States Patent
Marsh et al.

(10) Patent No.: US 7,978,322 B2
(45) Date of Patent: Jul. 12, 2011

(54) CALIBRATING AIRCRAFT SURFACES

(75) Inventors: Bobby J. Marsh, Lake Stevens, WA (US); Michael A. Lazar, Arlington, WA (US)

(73) Assignee: The Boeing Company, Chicago, IL (US)

( * ) Notice: Subject to any disclaimer, the term of this patent is extended or adjusted under 35 U.S.C. 154(b) by 259 days.

(21) Appl. No.: 12/367,354

(22) Filed: Feb. 6, 2009

(65) Prior Publication Data
US 2010/0201972 A1 Aug. 12, 2010

(51) Int. Cl.
*G01B 11/26* (2006.01)
(52) U.S. Cl. ............... 356/152.1; 356/3.01; 356/139.01; 356/139.03; 356/139.09; 356/139.1; 250/231.13; 369/89; 398/156
(58) Field of Classification Search ........ 356/3.01–28.5, 356/139.01–139.1, 152.1
See application file for complete search history.

(56) References Cited

U.S. PATENT DOCUMENTS

| | | | |
|---|---|---|---|
| 4,480,912 A * | 11/1984 | Snyder, Jr. | 356/138 |
| 6,230,382 B1 | 5/2001 | Cunningham et al. | |
| 6,317,954 B1 | 11/2001 | Cunningham et al. | |
| 6,484,381 B2 * | 11/2002 | Cunningham et al. | 29/407.09 |
| 7,194,326 B2 | 3/2007 | Cobb et al. | |
| 2004/0039465 A1 | 2/2004 | Boyer et al. | |
| 2005/0172470 A1 * | 8/2005 | Cobb et al. | 29/407.1 |

* cited by examiner

*Primary Examiner* — Thomas H Tarcza
*Assistant Examiner* — Luke D Ratcliffe
(74) *Attorney, Agent, or Firm* — Toler Law Group

(57) ABSTRACT

Systems and methods to calibrate aircraft surfaces are provided. A particular method includes installing a set of laser targets. The set of laser targets includes at least first laser target and a second laser target. The first laser target is installed on a first side of a first aircraft surface and the second laser target is installed on a second side of the first aircraft surface at a known location relative to the first laser target. The method also includes determining a first position of the first laser target with a first laser device. The method further includes determining a second position of the second laser target with a second laser device. The method includes determining a position of the first aircraft surface based on the first position of the first laser target and the second position of the second laser target.

18 Claims, 10 Drawing Sheets

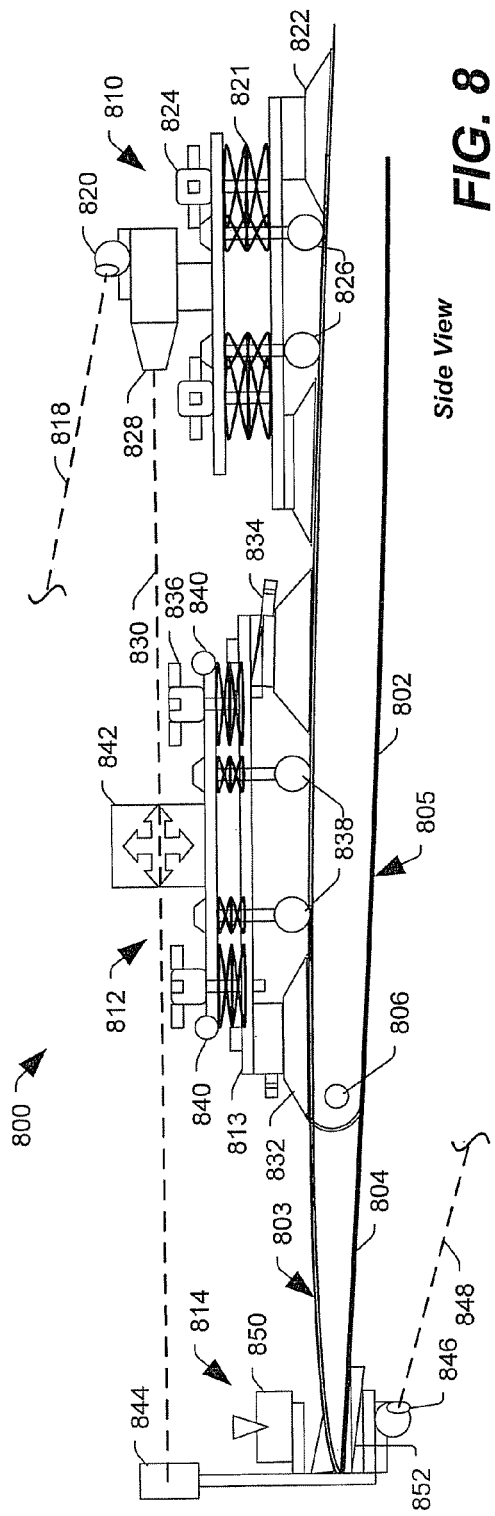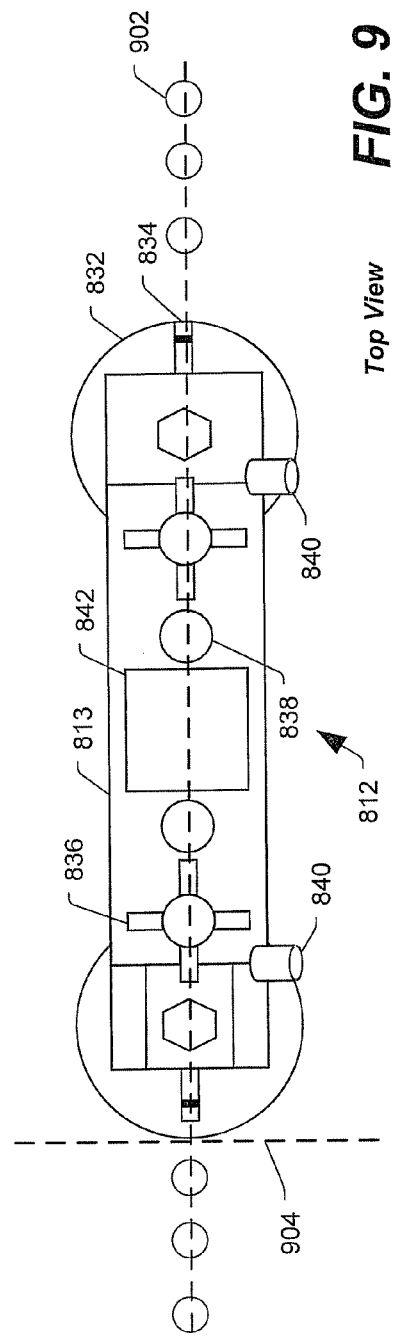

CALIBRATING AIRCRAFT SURFACES

FIELD OF THE DISCLOSURE

The present disclosure is generally related to calibrating aircraft surfaces.

BACKGROUND

Certain aircraft and other large machines use modular assembly techniques. For example, the aircraft or machine may be assembled using relatively large functional groups. To illustrate, rather than assembling an entire aircraft from the ground up as a single unit, the assembly process may be broken up so that functional modules are assembled separately and later joined together. For example, wings may be assembled from many pieces at a first assembly location then attached as a single unit to a fuselage assembly at a second location. Placement of these modules or functional groups can be an important aspect of the assembly process. For example, when aircraft are being assembled, improper placement of a functional group may reduce operational efficiency of the aircraft.

SUMMARY

Systems and methods to calibrate aircraft surfaces are disclosed. A particular method includes installing a set of laser targets. The set of laser targets includes a first laser target and a second laser target. The first laser target is installed on a first side of a first aircraft surface and the second laser target is installed on a second side of the first aircraft surface at a known location relative to the first laser target. The method also includes determining a first position of the first laser target with a first laser device and determining a second position of the second laser target with a second laser device. The method further includes determining a position of the first aircraft surface based on the first position of the first laser target and the second position of the second laser target.

In another particular embodiment, a calibration system includes a first laser target and a second laser target. The calibration system also includes at least one mounting coupler to secure the first laser target to a first side of an aircraft surface and to secure the second laser target to a second side of the aircraft surface. The calibration system further includes an alignment device that enables installation of the second laser target on the second side of the aircraft surface at a known location relative to the first laser target when the first laser target is installed on the first side of the aircraft surface.

In another particular embodiment, a method includes determining a first as-built position of a first wing of an aircraft and determining a second as-built position of a second wing of the aircraft. The method also includes generating an aerodynamic representation of the aircraft using the first as-built position and the second as-built position. The method further includes determining an installation location of an aircraft component to reduce drag of the aircraft based on the aerodynamic representation.

BRIEF DESCRIPTION OF THE DRAWINGS

FIG. 8 is a first illustration of a particular embodiment of an aircraft surface calibration system;
FIG. 9 is a second illustration of the particular embodiment of an aircraft surface calibration system.

DETAILED DESCRIPTION

The features, functions, and advantages that are discussed can be achieved independently in various embodiments disclosed herein or may be combined in yet other embodiments further details of which can be shown with reference to the following description and drawings.

A particular illustrative embodiment of the present disclosure employs a calibration system that enables determining positions of aircraft surfaces during assembly of an aircraft. The calibration system uses laser targets that are detectable by laser tracking devices to determine the location and orientation of various aircraft surfaces, such as wings, horizontal stabilizers, vertical stabilizers and control surfaces. The calibration system may be used to determine as-built positions of one or more of the aircraft surfaces and to generate a computational fluid dynamics model of the aircraft based on the as-built positions. The computational fluid dynamics model may be used to determine an installation location of one or more of the aircraft surfaces. The installation location(s) may be determined so as to reduce drag associated with one or more of the surfaces or drag associated with the aircraft as a whole. For example, after the wings are installed, the as-built positions of the wings may be determined using the calibration system and used to generate the computational fluid dynamics model. The computational fluid dynamics model may be used to determine installation positions of the horizontal stabilizers or the vertical stabilizer to reduce drag induced by the as-built positions of the wings. By installing the horizontal stabilizers, the vertical stabilizer, or any combination thereof at the determined installation positions, overall drag of the aircraft may be reduced resulting in significant cost savings. Additionally, time required to adjust trim settings associated with various control surfaces, such as flaps, ailerons, elevators and rudders may be reduced by adjusting the control surfaces based on the as-built positions and based on the aerodynamic representation of the fluid dynamic model. Further, the calibration system may enable as-built positions to be determined by placement of a small number of laser targets.

Figure 1:
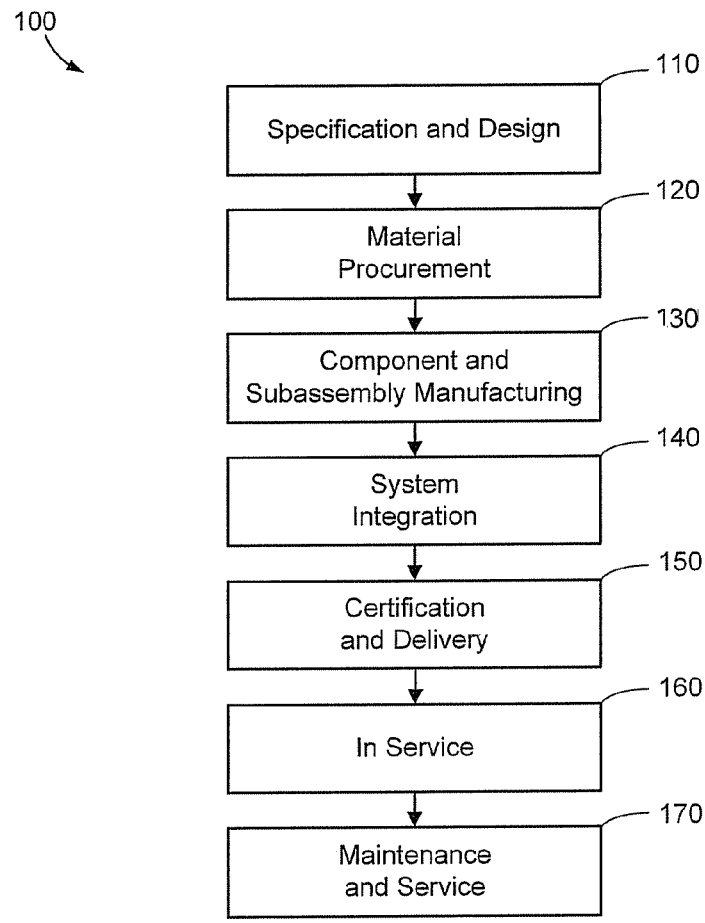
FIG. 1 is a flow diagram of an aircraft production and service methodology.
Figure 2:
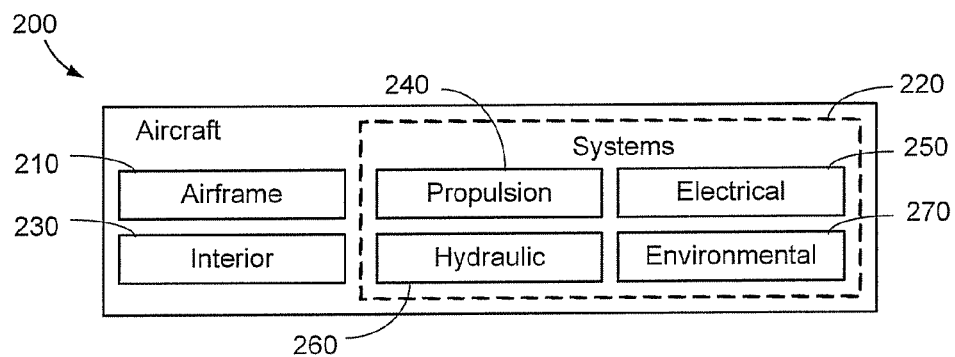
FIG. 2 is a block diagram of functional groups of an aircraft.

Referring more particularly to the drawings, embodiments of the disclosure may be described in the context of an aircraft manufacturing and service method 100 as shown in FIG. 1 and an aircraft 200 as shown in FIG. 2. During pre-production, an exemplary method 100 may include specification and design 110 of the aircraft 200 and material procurement 120. During production, component and subassembly manufacturing 130 and system integration 140 of the aircraft 200 takes place. Thereafter, the aircraft 200 may go through certification and delivery 150 in order to be placed in service 160. While in service by a customer, the aircraft 200 is scheduled for routine maintenance and service 170 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 200 produced by the exemplary method 100 may include an airframe 210 with a plurality of systems 220 and an interior 230. Examples of high-level systems 220 include one or more of a propulsion system 240, an electrical system 250, a hydraulic system 260, and an environmental system 270. Any number of other systems may be included. Although an aerospace example is shown, the principles of the various embodiments may be applied to other industries, such as the automotive industry.

Apparatus and methods embodied herein may be employed during any one or more of the stages of the production and service method 100. For example, components or subassemblies corresponding to production process 130 may be fabricated or manufactured in a manner similar to components or subassemblies produced while the aircraft 200 is in service. Also, one or more apparatus embodiments, method embodiments, or a combination thereof may be utilized during the production stages 140 and 140, for example, by substantially expediting assembly of or reducing the cost of an aircraft 200. Similarly, one or more of apparatus embodiments, method embodiments, or a combination thereof may be utilized while the aircraft 200 is in service, for example and without limitation, during maintenance and service 170.

Figure 3:
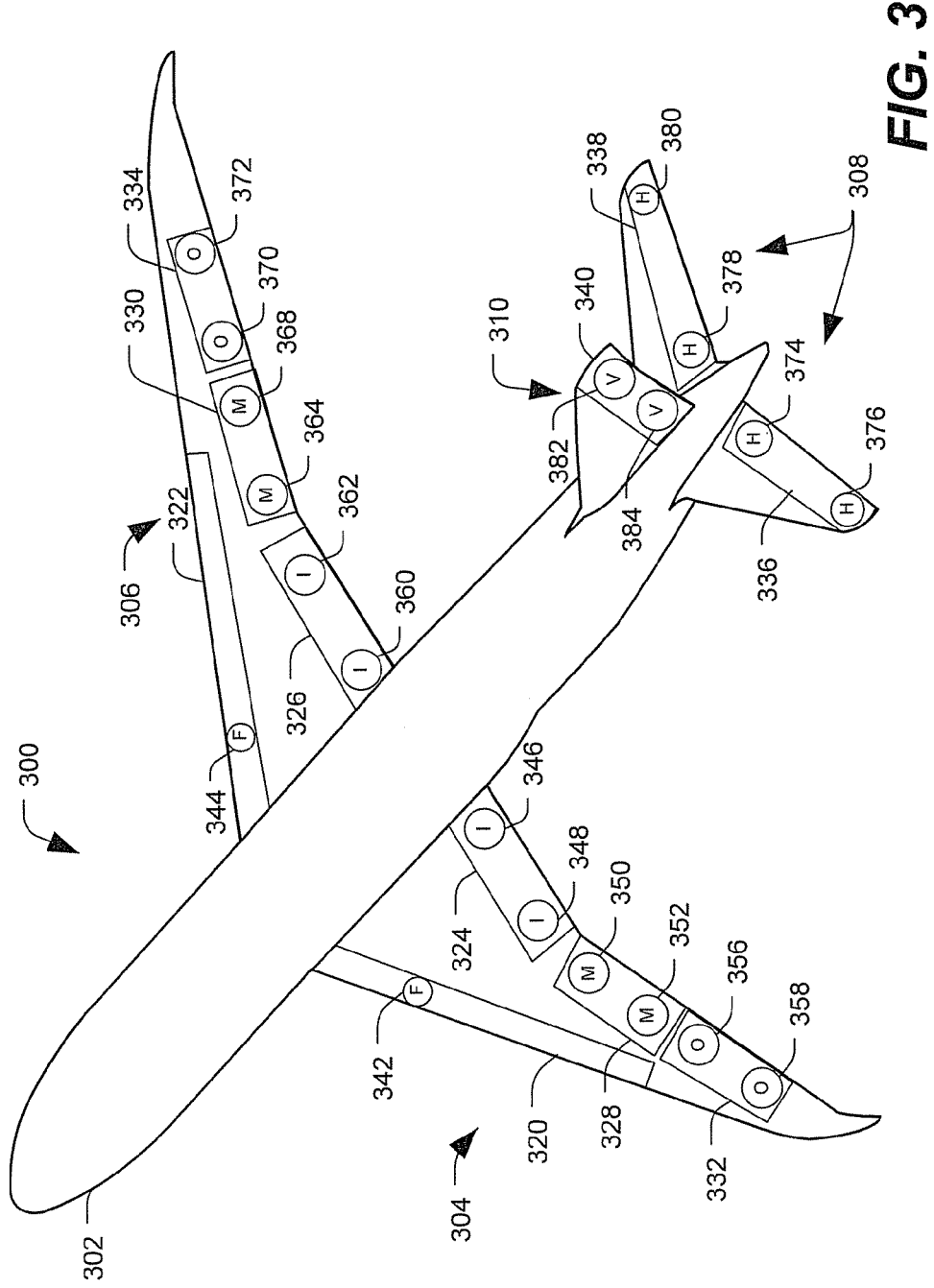
FIG. 3 is an illustration of an aircraft and a first embodiment of an aircraft surface calibration system.

FIG. 3 is an illustration of an aircraft 300 and a first embodiment of an aircraft surface calibration system. The aircraft 300 includes a fuselage 302, a first wing 304, a second wing 306, and a plurality of tail surfaces, such as horizontal stabilizers 308 and a vertical stabilizer 310. The wings 304, 306 and the tail surfaces 308, 310 include a plurality of control surfaces. For example, the wings 304, 306 may include Krueger flaps 320, 322 on a leading edge of the wings 304, 306. In another example, the wings 304, 306 may include inboard flaps 324, 326; mid-line flaps 328, 330; outboard ailerons 332, 334; other control surfaces; or any combination thereof. The tail surfaces 308, 310 may include control surfaces, such as a rudder 340 coupled to the vertical stabilizer 310; elevators 336, 338 coupled to the horizontal stabilizers 308; other control surfaces; or any combination thereof.

In a particular embodiment, during or after assembly of the aircraft 300, calibration devices are coupled to surfaces of the aircraft 300 to determine position information regarding the surfaces. The calibration devices coupled to trailing edges of the wings 304, 306 may include inboard calibration devices 346, 348, 360 362; mid-line calibration devices 350, 352, 364, 368; and outboard calibration devices 356, 358, 370, 372. The calibration devices coupled to leading edges of the wings 304, 306 may include flap calibration devices 342, 344. The calibration devices coupled to the horizontal stabilizers 308 may include horizontal stabilizer calibration devices 374, 376, 378, 380. The calibration devices coupled to the vertical stabilizer 310 may include vertical stabilizer calibration devices 382, 384. In a particular illustrative embodiment, a pair of calibration devices is associated with each control surface at a trailing edge, and a single calibration device is associated with each leading edge control surface.

The calibration devices 342-384 may be used to determine as-built positions of one or more surfaces of the aircraft 300. In a particular embodiment, the calibration devices 342-384 may include one or more components of the calibration system described with reference to FIGS. 8 and 9. In a particular embodiment, the wings 304, 306 are assembled as entire sub-components before being coupled to the fuselage 302. Likewise, the tail surfaces 308, 310 may be assembled as entire sub-components before being coupled to the fuselage 302. The calibration devices 342-384 may be used to determine as-built position information as the wings 304, 306 are coupled to the fuselage 302 or after the wings 304, 306 are coupled to the fuselage 302. The as-built position information may be used to adjust the installed position of the wings 304, 306 on the fuselage 302. For example, when the as-built position information indicates that the position of the wings 304, 306 with respect to the fuselage 302 or with respect to each other is incorrect, one or both of the wings 304, 306 may be adjusted. Additionally, or in the alternative, the as-built position information regarding the wings 304, 306 may be used to adjust controls surfaces 320-334 of the wings 304, 306. For example, the as-built position of the first wing 304 may be used to determine an adjusted position of the first inboard flap 324, to determine an adjusted position of the first mid-line flap 328, to determine an adjusted position of the first outboard flap 332, to determine an adjusted position of the first Krueger flap 320, to determine an adjusted position of another control surface of the first wing 304, or any combination thereof. The as-built position information may also be used to determine or adjust an installed position of one of the tail surfaces 308, 310 or control surfaces 336-340 associated with the tail surfaces 308, 310.

In a particular embodiment, the as-built position information is used to generate an aerodynamic representation of the aircraft 300. For example, the aerodynamic representation of the aircraft 300 may include a computational fluid dynamics model of the aircraft 300. The aerodynamic representation of the aircraft 300 may be used to estimate drag associated with various surfaces of the aircraft 300 or the aircraft 300 as a whole. The aerodynamic representation of the aircraft 300 may be used to determine an adjusted position of one of the wings 304, 306, one of the tail surface 308, 310, one of the control surfaces 320-340, or any combination thereof. For example, after the wings 304, 306 are attached to the fuselage 302, an as-built position of the wings 304, 306 may be determined using the calibration devices 342-372 associated with the wings 304, 306. The as-built position of the wings 304. 306 may include wing sweep angles of the wings, a dihedral angle of the wings, angles of incidence of the wings 304, 306, or other location or orientation measures associated with one wing, both wings or the wings and the fuselage. After drag associated with the aircraft 300 is determined, the aerodynamic representation of the aircraft 300 may be used to determine an installation position of one or more of the tail surfaces, such as the horizontal stabilizers 308, the vertical stabilizers 310 or control surfaces 336-340 associated with the tail surfaces 308, 310.

Figure 4:
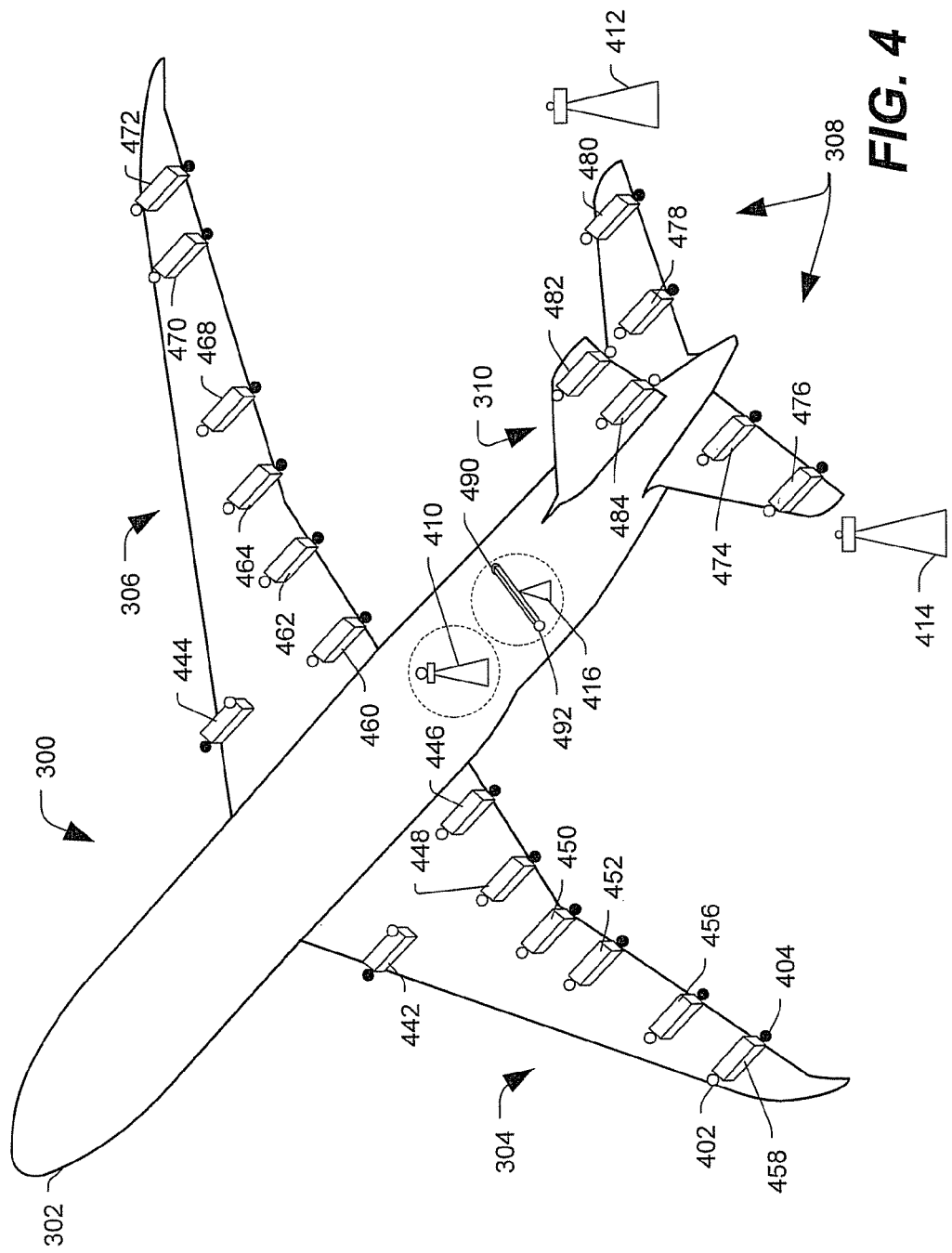
FIG. 4 is a first illustration of a second embodiment of an aircraft and an aircraft surface calibration system.

FIG. 4 shows a first illustration of the aircraft 300 and a second embodiment of an aircraft surface calibration system. The aircraft surface calibration system includes a plurality of calibration devices 442-484. Each of the calibration devices 442-484 may be coupled to a surface of the aircraft 300. For example, the calibration devices 442-484 may be coupled to the wings 304, 306; the tails surfaces 308, 310, other aircraft surfaces, or any combination thereof. In a particular embodiment, the calibration devices 442-484 are coupled to control surfaces (not shown in FIG. 4) such as flaps, ailerons, elevators, rudders, and so forth.

In a particular embodiment, each of the calibration devices 442-484 includes a set of laser targets. For example, a first exemplary calibration device 458 includes at least a first laser target 402 and a second laser target 404. The first laser target 402 may be adapted to be coupled to a first side of a surface of the aircraft 300 and the second laser target 404 may be adapted to be coupled to a second side of the surface. For example, as illustrated by the first exemplary calibration device 458, the first side may include an upper side of the first wing 304 and the second side may include a lower side of the first wing 304. In FIGS. 4-7, the position of the laser targets is illustrated by the fill color of the laser targets. That is, laser targets illustrated as white in FIGS. 4-7 (such as the first laser target 402) are positioned on a first side of the surface of the aircraft 300 and laser targets illustrated as black in FIGS. 4-7 (such as the second laser target 404) are positioned on the second side, opposite the first side, of the surface of the aircraft 300. For example, for vertical surfaces, such as the vertical stabilizer 310, the white laser targets are coupled to a first side of the vertical surface, such as the left side, and the black laser targets are coupled to a second side of the vertical surface, such as the right side.

The aircraft surface calibration system also includes a plurality of laser devices 410-414. The laser devices 410-414 may include laser tracking devices, each adapted to determine a distance between one or more of the laser targets 442-484 and the laser devices 410-414. The laser devices 410-414 may include a midline or buttline laser device 410, a right-side laser device 412 and a left-side laser device 414. In a particular embodiment, the buttline laser device 410 is adapted to shine a beam of light on laser targets positioned below the aircraft 300, such as on a lower side of the wings 304, 306 or horizontal stabilizers 308. The right-side laser device 412 is adapted to shine a beam of light on laser targets positioned above the aircraft 300 and on the right side of the aircraft 300. For example, the right-side laser device 412 may shine the beam of light on the right-side, upper laser targets on the right wing 306, on the right horizontal stabilizer 308 and on the right side of the vertical stabilizer 310. The left-side laser device 414 is adapted to shine a beam of light on laser targets positioned above the aircraft 300 and on the left side of the aircraft 300. For example, the left-side laser device may shine the beam of light on left-side, upper laser targets on the left wing 304, on the left horizontal stabilizer 308 and on the left side of the vertical stabilizer 310.

The aircraft surface calibration system also includes a scale bar 416. The scale bar 416 may include a plurality of laser targets 490, 492. The laser targets 490, 492 of the scale bar 416 may have a known location with respect to one another. For example, the laser targets 490, 492 may be a known distance from one another. As is discussed further with reference to FIG. 7, each laser device 410-414 can determine its own position relative to the laser targets 490, 492 of the scale bar 416 based on the known locations of the laser targets 490, 492 of the scale bar 416. The relative positions of the laser devices 410-414 can be used to determine the relative positions of the laser targets 442-484 coupled to the aircraft 300. Thus, the scale bar 416 acts as a standard to determine relative positions of components of the aircraft surface calibration system.

Figure 5:
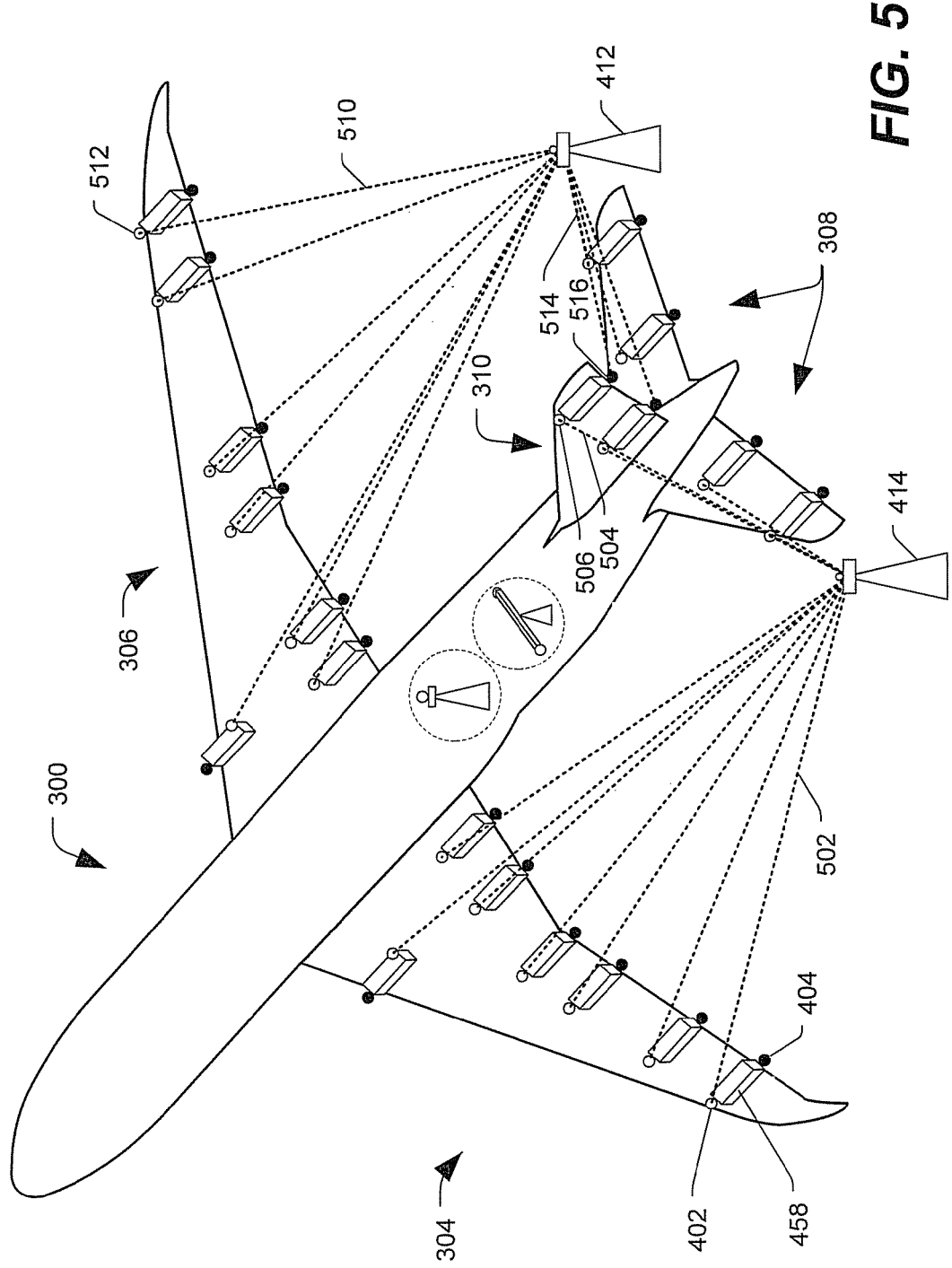
FIG. 5 is a second illustration of the second embodiment of the aircraft and the aircraft surface calibration system.

FIG. 5 is a second illustration of the aircraft 300 and the second embodiment of the aircraft surface calibration system discussed with reference to FIG. 4. FIG. 5 illustrates the right-side laser device 412 and the left-side laser device 414 shining beams of light on the laser targets of the aircraft surface calibration system. For example, the left-side laser device 414 is shining the beam of light 502 on the upper laser target 402 of the aircraft surface calibration system. Additionally, the left-side laser device 414 is shining a beam of light 504 on a left-side laser target 506 coupled to the vertical stabilizer 310. The left-side laser device 414 is also shining beams of light on other laser targets coupled to the aircraft 300. In particular, the left-side laser device 414 is shining beams of light on laser targets coupled to upper surfaces on the left side of the aircraft 300. In another example, the right-side laser device 412 is shining a beam of light 510 on an upper laser target 512 of the aircraft surface calibration system on the right wing 306 of the aircraft 300. Additionally, the right-side laser device 412 is shining a beam of light 514 on a right-side laser target 516 coupled to the vertical stabilizer 310. The right-side laser device 412 is also shining beams of light on other laser targets coupled to the aircraft 300. In particular, the right-side laser device is shining beams of light on laser targets coupled to upper surfaces on the right side of the aircraft 300.

The right-side laser device 412 and the left-side laser device 414 use information determined based on shining the beams of light on the laser targets to determine relative positions of the laser targets. For example, the laser devices 412, 414 may receive reflected light from the laser targets and calculate, based on the reflected light, a distance to each laser target and a direction (e.g., a horizontal angle, a vertical angle or both) to each laser target.

Figure 6:
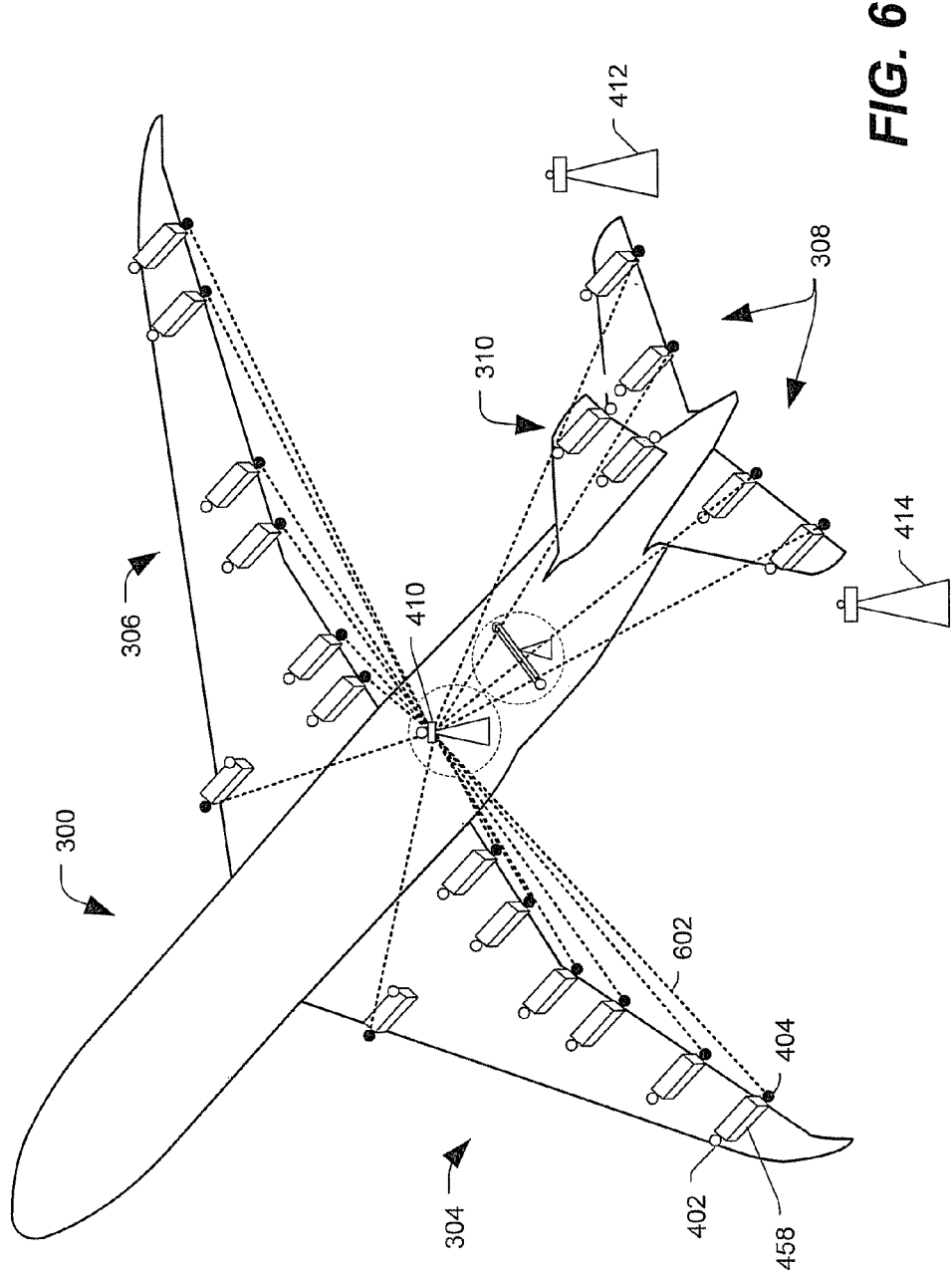
FIG. 6 is a third illustration of the second embodiment of the aircraft and the aircraft surface calibration system.

FIG. 6 is a third illustration of the aircraft 300 and the second embodiment of the aircraft surface calibration system discussed with reference to FIGS. 4 and 5. FIG. 6 illustrates the buttline laser device 410 shining beams of light on the laser targets of the aircraft surface calibration system. For example, the buttline laser device 410 is shining a beam of light 602 on the lower laser target 404 of the first exemplary calibration device 458. The buttline laser device 410 is also shining beams of light on other laser targets coupled to lower surfaces of the aircraft. The buttline laser device 410 uses information determined based on shining the beams of light on the laser targets to determine relative positions of the laser targets. For example, the buttline laser device 410 may receive reflected light from the laser targets and calculate, based on the reflected light, a distance to each laser target and a direction (e.g., a horizontal angle, a vertical angle, or both) to each laser target.

Figure 7:
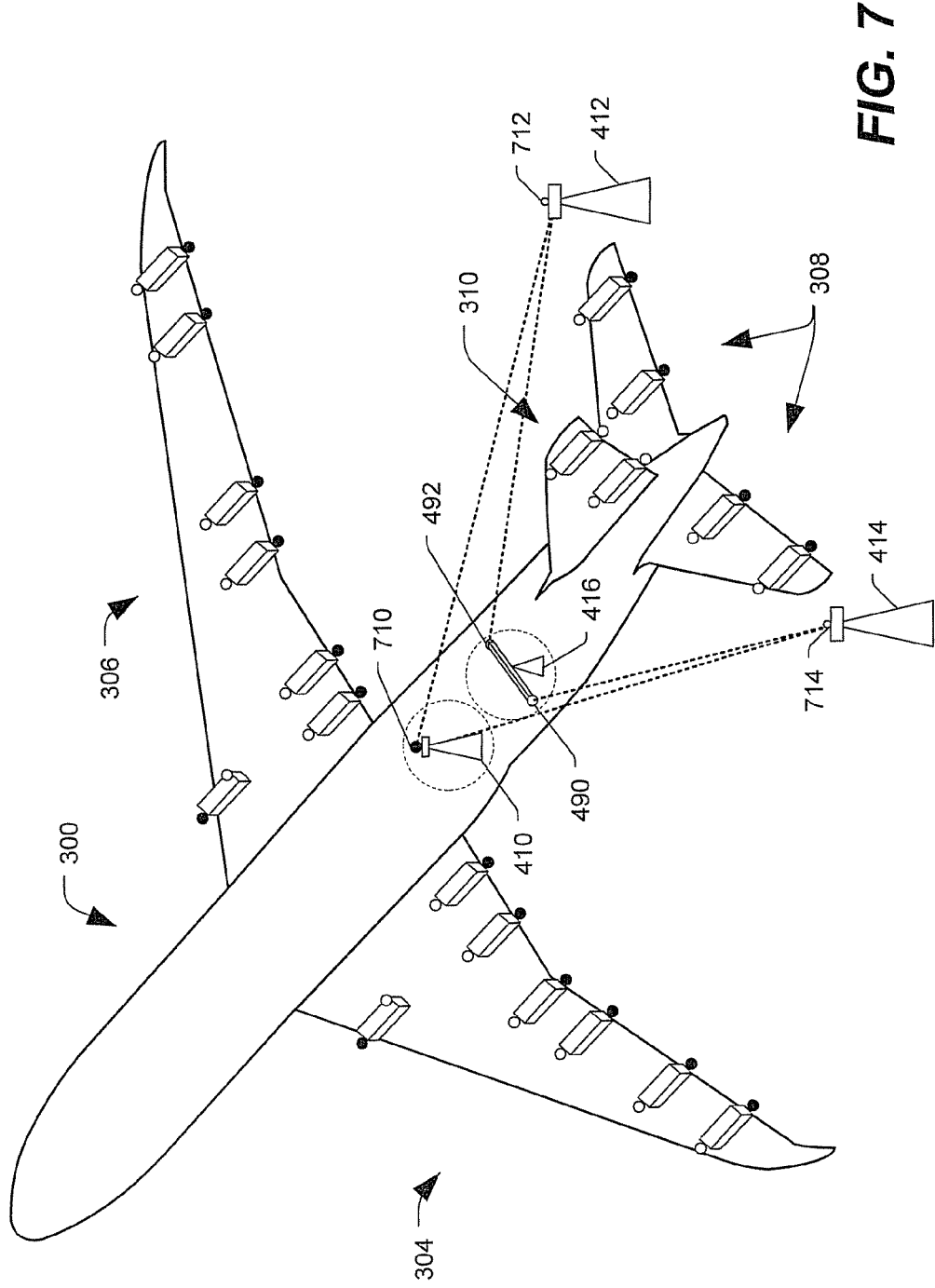
FIG. 7 is a fourth illustration of the second embodiment of the aircraft and the aircraft surface calibration system.

FIG. 7 is a fourth illustration of the aircraft 300 and the second embodiment of the aircraft surface calibration system discussed with reference to FIGS. 4-6. FIG. 7 illustrates the laser devices 410-414 determining their positions with respect to one another. For example, one or more of the laser devices 410-414 may include a laser target. To illustrate, the buttline laser device 410 may include a first laser target 710, the right-side laser device 412 may include a second laser 712, and the left side-laser device 414 may include a third laser target 714. Each of the laser devices 410-414 may shine a beam of light on the laser target 710-714 associated with the other laser devices 410-414. Each of the laser device 410-414 may use information determined based on shining the beams of light on the laser targets 710-714 to determine relative positions of the other laser devices 410-414. For example, the buttline laser device 410 may receive reflected light from the laser targets 712 and 714 and calculate, based on the reflected light, a distance to the right-side laser device 412, a distance to the left-side laser device 414, and a direction (e.g., a horizontal angle, a vertical angle, or both) to each.

Additionally, or in the alternative, one or more of the laser devices 410-414 may shine beams of light on the laser targets 490, 492 of the scale bar 416. Since the laser targets 490, 492 of the scale bar 416 have a known position, information about the position of the laser targets 490, 492 of the scale bar 416 can be used to determine position information regarding any of the other devices of the aircraft surface calibration system.

FIG. 8 is an illustration of a particular embodiment of an aircraft surface calibration system 800. The aircraft surface calibration system 800 is adapted to determine position information related to an aircraft surface 802. The aircraft surface 802 may, for example, include a wing, a horizontal stabilizer, a vertical stabilizer, another aircraft surface, or any combination thereof. In a particular embodiment, the aircraft surface 802 may include a moveable portion 804, such as control surface. For example, the moveable portion 804 may include a flap, elevator, aileron or rudder that is moveable about a hinge 806. Additionally, the aircraft surface 802 includes a first side 803 and a second side 805. For example, where the aircraft surface 802 is a wing, the first side 803 is an upper side and the second side 805 is a lower side. In another example, where the aircraft surface 802 is a vertical stabilizer, the first side 803 may be the right side and the second side 805 may be the left side.

The aircraft surface calibration system 800 may include a plurality of components, such as a first component 810, a second component 812, and a third component 814. Generally, the first component 810 may be adapted to position a first laser target 820 at a known location with respect to the first side 803 of the aircraft surface 802. For example, where aircraft surface 802 is a wing, the first component 810 is mountable to the wing such that the first laser target 820 has a known height above the upper surface of the wing. For example, the first component 810 may include a mounting coupler 821. The mounting coupler 821 may include one or more suction mounts 822 and height adjustments 824, such as threaded members. The mounting coupler 821 may also include one or more height stops 826. The first component 810 also includes a calibration laser 828 that has a known distance from the first laser target 820. The calibration laser 828 is used to adjust the position of a second laser target 846 with respect to the first laser target 820, as discussed further below.

The first component 810 may be installed by locating an installation position of the first component 810 and applying the suction mounts 822 to the aircraft surface 802 at the installation position. The installation position may be at a known distance along a length of the surface 802. (Note that, in FIG. 8, the length of the surface 802 is not illustrated since it projects into and out of the plane of the drawing.) In an illustrative embodiment, the first component 810 is aligned with a rivet line of the aircraft surface 802, such as a rivet line 902 illustrated in FIG. 9, during installation. The height adjustments 824 may be adjusted until the height stops 826 touch the first side 803 of the aircraft surface 802. When the height stops 826 are in contact with the first side 803, the first laser target 820 is at a known distance from the first side 803. Thus, when the first component 810 is installed on an upper surface of a wing, the height of the first laser target 820 above the wing and the location of the first laser target 820 along a length of the wing are known.

The third component 814 includes the second laser target 846. The third component 814 is adapted to hold the second laser target 846 on the second side 805 of the aircraft surface 802 when a mounting coupler 852 (such as a clamping device) is secured to the aircraft surface 802. In a particular embodiment, the third component 814 includes an alignment device that enables installation of the second laser target 846 on the second side 805 of the aircraft surface 802 at a known location relative to the first laser target 820 when the first laser target 820 is installed on the first side 803 of the aircraft surface 802. For example, the alignment device may include a calibration laser target 844. The calibration laser target 844 is a known distance from the second laser target 846. The calibration laser target 844 may be used to adjust the position of the second laser target 846 with respect to the first laser target 820, as discussed further below. The third component 814 also includes an inclinometer 850. The inclinometer 850 is adapted to determine an incline angle of the moveable portion 804 of the aircraft surface 802.

The second component 812 includes a mounting coupler 813. The mounting coupler 813 includes one or more suction mounts 832. In a particular embodiment, the suction mounts 832 of the second component 812, the suction mounts 822 of the first component 810 or both may include, visual indicators 834 to provide a visual indication of whether the suction mounts 822, 832 are secured to the aircraft surface 802. The mount coupler 813 may also include height adjustments 836 that allow a distance of the mounting coupler 813 from the first side 803 to be adjusted. The height adjustments 836 may be limited by height stops 838. In a particular embodiment, the second component 812, the first component 810, or both, may include height adjustment indicators 840. The height adjustment indicators 840 may provide a visual or audible queue when the height stops 838, 826 are in contact with the aircraft surface 802.

The second component 812 also includes an alignment filter 842. The alignment filter 842 is adapted to be positioned between the calibration laser 828 and the calibration laser target 844. That is, when the second laser target 846 is at the known location relative to the first laser target 820, the calibration laser 828 shines a beam of light 830 on the calibration laser target 844 through the alignment filter 842.

In operation, the first component 810 may be installed at a desired position on the aircraft surface 802. For example, the first component 810 may be installed along a rivet line on a wing of the aircraft. During installation of the first component 810, the distance of the first laser target 820 from the first side 803 of the aircraft surface 802 may be adjusted using the height adjustments 824 and height stops 826. The second component 812 may be installed and aligned with the first component 810. For example, the second component 812 may be installed so that the beam of light 830 from the calibration laser 828 projects through the alignment filter 842. Additionally, the distance of the alignment filter 842 from the first side 803 of the aircraft surface 802 may be adjusted using the height adjustments 836 and the height stops 838. The third component 814 may be installed such that the beam of light 830 from the calibration laser 828 strikes the calibration target 844. The moveable portion 804 of the aircraft surface 802 may be adjusted (e.g., by pivoting around the axis 806) to facilitate alignment of the calibration target 844 with the beam of light 830 based on a reading of the inclinometer 850. In various embodiments, the first component 810, the second component 812 and the third component 814 are installed in a different order. That is, the third component 814 or the second component 812 may be installed first rather than the first component 810 being installed first, as described above. The calibration system 800 facilitates alignment of the components 810-814 so that a relative position of the first laser target 820 and the second laser target 846 are known when the installation is complete. Thus, a first laser 818 may be shined on the first target 820 and a second laser 848 may be shined on the second laser target 846 to determine the position of each target with respect to sources of the lasers 818, 848.

FIG. 9 is a second illustration of a particular embodiment of the aircraft surface calibration system. FIG. 9 shows a top view of the second component 812 of the calibration system 800 discussed with reference to FIG. 8. FIG. 9 also illustrates alignment of the calibration system 800 with a reference mark or reference point of an aircraft surface, such as the aircraft surface 802 of FIG. 8. For example, one or more of the components of the calibration system, such as the second component 812, may be aligned with a rivet line 902 of the aircraft surface. In another example, one or more of the components of the calibration system, such as the second component 812, may be aligned with a hinge line 904 of a moveable portion of the aircraft surface.

Figure 10:
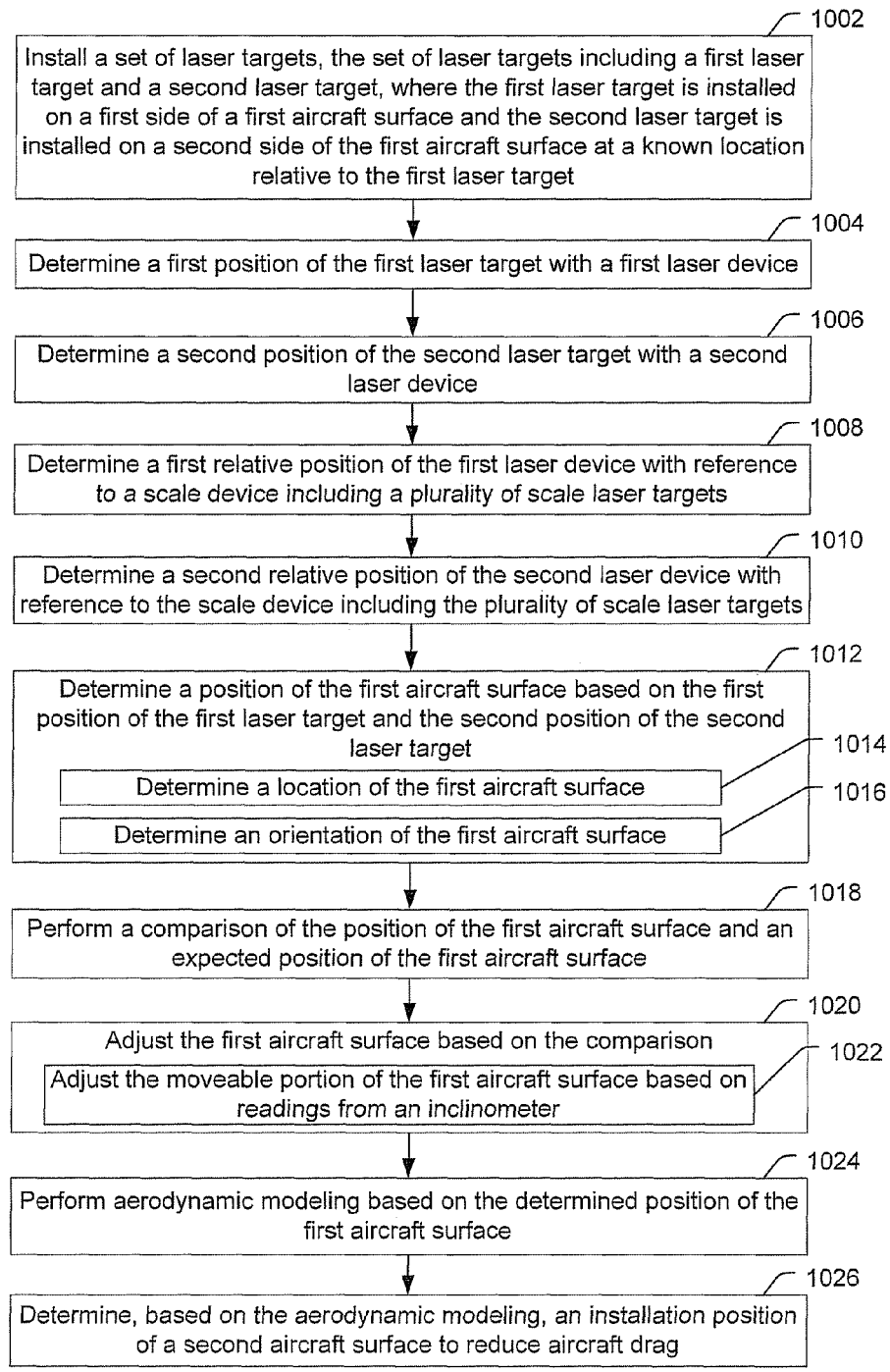
FIG. 10 is a flow diagram of a first particular embodiment of a method of calibrating aircraft surfaces.

FIG. 10 is a flow diagram of a first particular embodiment of a method of calibrating aircraft surfaces. The method includes, at 1002, installing a set of laser targets on surfaces of an aircraft. The surfaces on which the laser targets are installed may include wing surfaces, tail surfaces, control surfaces, other aircraft surfaces, or any combination thereof. For example, the surfaces may include one or more of the surfaces discussed with reference to FIG. 3. The laser targets may be components of calibration devices, such as the calibration devices discussed with reference to FIG. 4-7 or FIGS. 8 and 9. In a particular embodiment, the set of laser targets includes a first laser target and a second laser target, where the first laser target is installed on a first side of a first aircraft surface and the second laser target is installed on a second side of a first aircraft surface at a known location relative to the first laser target. For example, the first aircraft surface may include a wing. In this example, the first side of the wing may be an upper surface of the wing and the second side of the wing may be a lower surface of the wing. In another example, the first aircraft surface may be a vertical stabilizer. In this example, the first side of the vertical stabilizer may be the left side of the vertical stabilizer and the second side of the vertical stabilizer may be the right side of the vertical stabilizer.

The method also includes, at 1004, determining a first position of the first laser target with a first laser device and, at 1006, determining a second position of the second laser target with a second laser device. For example, the first laser target may be coupled to an upper surface of the aircraft and the second laser target may be coupled to a lower surface of the aircraft. In this example, a lower laser device, such as the buttline laser device 410 discussed with reference to FIG. 4, may determine the position of the second laser target and an upper laser device, such as the right-side laser device 412 or the left-side laser device 414 discussed with reference to FIG. 4, may determine the position of the first laser target. In another example, the first laser target may be coupled to the right-side of a surface of the aircraft and the second laser target may be coupled to the left side of the surface. In this example, a right-side laser device, such as the right-side laser device 412 discussed with reference to FIG. 4, may determine the position of the first laser target and a left-side laser device, such as the left-side laser device 414 discussed with reference to FIG. 4, may determine the position of the second laser target.

In a particular embodiment, the method also includes, at 1008, determining a first relative position of the first laser device with reference to a scale device including a plurality of scale laser targets, and, at 1010, determining a second relative position of the second laser device with reference to the scale device including the plurality of scale laser targets. For example, the first laser device and the second laser device may determine their locations relative to a scale bar, such as the scale bar 416 discussed with reference to FIG. 4. The plurality of scale laser targets of the scale device may have a known location with respect to one another. As such, the locations of the scale targets measured by the laser devices can be used to determine the locations of the laser devices relative to the scale device, relative to one another, or both.

The method further includes, at 1012, determining a position of the first aircraft surface based on the first position of the first laser target and the second position of the second laser target. For example, distances and directions to the laser targets coupled to the first aircraft surface may be analyzed with respect to the relative positions of the first laser device and the second laser device to determine relative positions of the laser targets. The laser targets may have a known position relative to one or more surfaces of the aircraft, such as the first aircraft surface. In a particular embodiment, determining the position of the first aircraft surface includes determining a location of the first aircraft surface, at 1014; and determining an orientation of the first aircraft surface, at 1016; or both. That is, the position of the first aircraft surface may include a location of the aircraft surface with respect to a particular coordinate system. For example, when a Cartesian coordinate system is used, the location of the surface may include information about where a point on the surface resides with respect to one or more axes of the coordinate system. The position of the first aircraft surface may also include information about the orientation of the surface. The orientation of the surface includes information about rotation of the surface with respect to one or more of the axes. Thus, based on the determined position of the first surface and other known information about the surface, such as dimensions of the surface, a three dimension model of the surface can be generated.

The method may also include, at 1018, performing a comparison of the position of the first aircraft surface and an expected position of the first aircraft surface. The determined position of the first aircraft surface is an "as-built" position. For example, when the first aircraft surface is a wing, the determined position includes information describing where the wing actually was installed on the aircraft and its orientation with respect to other aircraft surfaces (e.g., other wings, tails surfaces, controls surfaces, or fuselage surfaces). The as-built position may be compared to a design specification to determine whether the as-built position is acceptable based on the design specification. In a particular embodiment, when the as-built position is not acceptable, the method may include, at 1020, adjusting the first aircraft surface based on the comparison. To illustrate, a sweep angle of a wing may be determined to be incorrect based on the as-built position. Based on this determination, a shim may be installed between the wing and the fuselage or an existing shim may be modified to correct the sweep angle. Similarly, when the as-built position indicates that a trailing edge location or orientation of a wing is not acceptable, one or more control surfaces associated with the wing may be trimmed (i.e., the neutral position of the control surface may be adjusted) to correct the as-built position.

In a particular embodiment, the as-built position of the first aircraft surface may be adjusted based on other information derived from calibration devices that include the set of laser targets. For example, one or more of the calibration devices may include an inclinometer, as described with reference to FIG. 8. Thus, a first laser target of the set of laser targets may be coupled to a fixed portion of the first aircraft surface, such as a wing, and a second laser target of the set of laser targets may be coupled to a moveable portion of the first aircraft surface. In this arrangement, the inclinometer is coupled to the second laser target and is installed on the moveable portion of the first aircraft surface. The method may include, at 1022, adjusting the moveable portion of the first aircraft surface, after installing the second laser target, based on readings from the inclinometer. For example, the moveable portion of the first aircraft surface may be trimmed to reduce drag or to achieve a desired position of the first aircraft surface based on the design specification.

The method may also include, at 1024, performing aerodynamic modeling based on the determined position of the first aircraft surface. As discussed above, the determined position of the first aircraft surface may be used to generate a three dimension model of the surface. The aerodynamic model may include a computational fluid dynamics model adapted to analyze (or model) the aerodynamic performance of the first aircraft surface or of the aircraft as a whole. In a particular embodiment, the method further includes, at 1026, determining an installation position of a second aircraft surface to reduce aircraft drag based on the aerodynamic modeling. For example, the first aircraft surface may be a wing and the second aircraft surface may be a tail surface, such as a horizontal stabilizer or vertical stabilizer. After the wing is coupled to the fuselage, the as-built position of the wing may be determined and used to generate the aerodynamic model. The aerodynamic model may be used to determine an installation position for the tail surface that will reduce overall drag of the aircraft.

Figure 11:
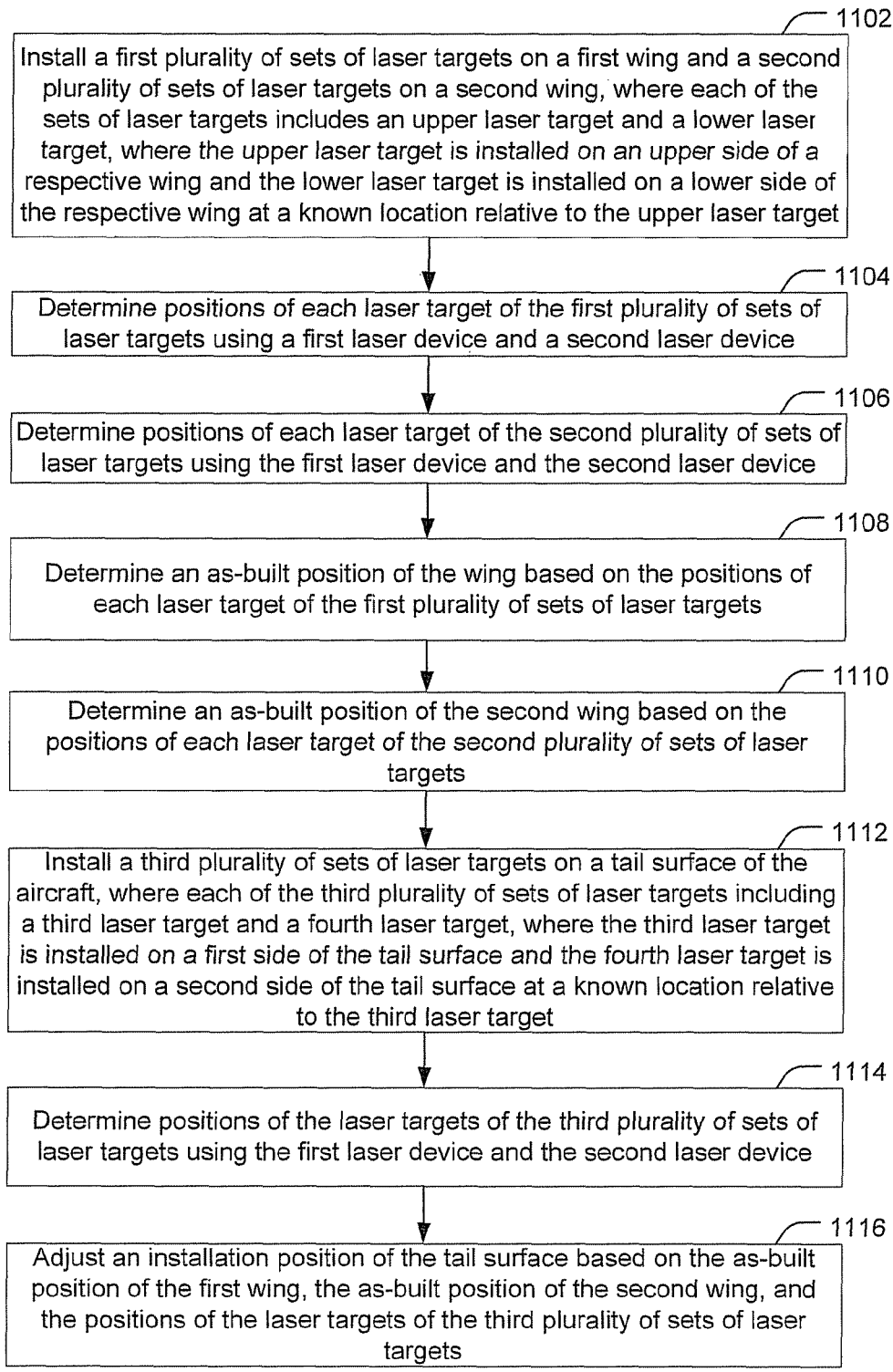
FIG. 11 is a flow diagram of a second particular embodiment of a method of calibrating aircraft surfaces.

FIG. 11 is a flow diagram of a second particular embodiment of a method of calibrating aircraft surfaces. The method includes, at 1102, installing a first plurality of sets of laser targets on a first wing and a second plurality of sets of laser targets on a second wing. For example, the sets of laser targets may be components of a calibration system, such as one of the calibration systems discussed with reference to FIG. 4-7 or FIGS. 8 and 9. Each of the sets of laser targets includes an upper laser target and a lower laser target. The upper laser target is installed on an upper side of a respective wing and the lower laser target is installed on a lower side of the respective wing at a known location relative to the upper laser target.

The method also includes, at 1104, determining positions of each laser target of the first plurality of sets of laser targets using a first laser device and a second laser device, and, at 1106, determining positions of each laser target of the second plurality of sets of laser targets using the first laser device and the second laser device. For example, the first laser device may include a laser device adapted to determine positions of upper laser targets and the second laser device may be adapted to determine positions of lower laser targets. To illustrate, the first laser device may include the right-side laser device 412 or the left-side laser device 414 and the second laser device may include the buttline laser device 410, as discussed with reference to FIGS. 4-7. In another example, the first laser device may include a laser device adapted to determine positions of laser targets on a first side of the aircraft and the second laser device may be adapted to determine positions of laser targets on a second side of the aircraft. To illustrate, the first laser device may include the right-side laser device 412 and the second laser device may include the left-side laser device 414, as discussed with reference to FIGS. 4-7.

The method further includes, at 1108, determining an as-built position of the first wing based on the positions of each laser target of the first plurality of sets of laser targets, and, at 1110, determining an as-built position of the second wing based on the positions of each laser target of the second plurality of sets of laser targets. The as-built position of a wing refers to the location, orientation, or both, of the wing after the wing is coupled to a fuselage of the aircraft.

In a particular embodiment, the method also includes, at 1112, installing a third plurality of sets of laser targets on a tail surface of the aircraft. For example, the tail surface may include a horizontal stabilizer, a vertical stabilizer, a control surface associated with the horizontal stabilizer or vertical stabilizer, another aircraft surface, or any combination thereof. Each of the third plurality of sets of laser targets may include a third laser target and a fourth laser target. For example, the third laser target may be installed on a first side of the tail surface and the fourth laser target may be installed on a second side of the tail surface at a known location relative to the third laser target. To illustrate, the third laser target may be installed on a right side of a vertical stabilizer and the fourth laser target may be installed on a left side of the vertical stabilizer. In another illustrative example, the third laser target may be installed on an upper side of a horizontal stabilizer and the fourth laser target may be installed on a lower side of the horizontal stabilizer.

The method may also include, at 1114, determining positions of the laser targets of the third plurality of sets of laser targets using the first laser device and the second laser device. For example, the first laser device may shine a beam of light on the third laser target and determine, based on light reflected from the third laser target, a distance and direction from the first laser device to the third laser target. Similarly, the second laser device may shine a beam of light on the fourth laser target and determine, based on light reflected from the fourth laser target, a distance and direction from the second laser device to the fourth laser target. An installation position of the tail surface may be adjusted, at 1116, based on the as-built position of the first wing, the as-built position of the second wing and the positions of the laser targets of the third plurality of sets of laser targets.

Figure 12:
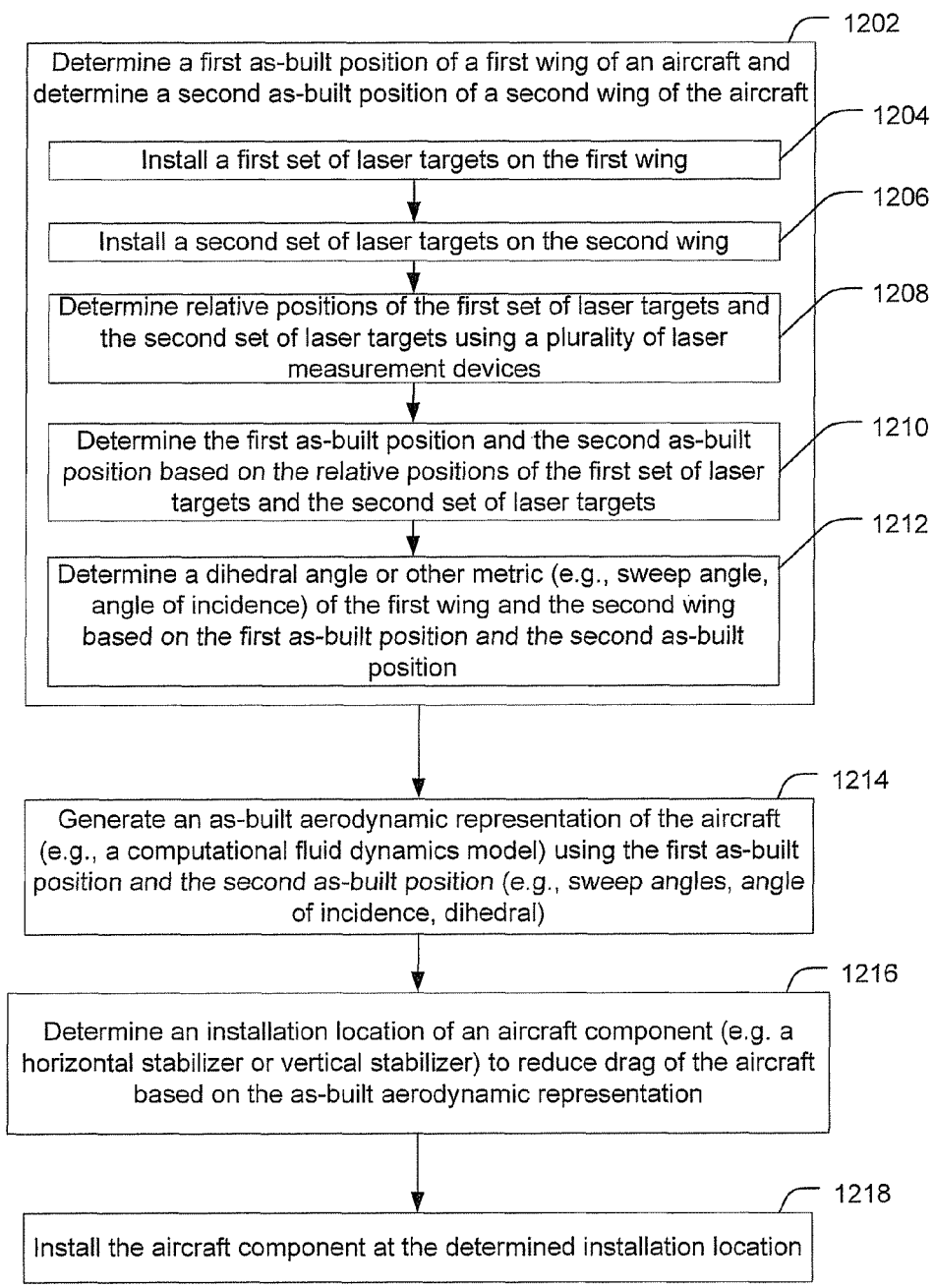
FIG. 12 is a flow diagram of a third particular embodiment of a method of calibrating aircraft surfaces.

FIG. 12 is a flow diagram of a third particular embodiment of a method of calibrating aircraft surfaces. The method includes, at 1202, determining a first as-built position of a first wing of an aircraft and determining a second as-built position of a second wing of the aircraft. In a particular embodiment, the as-built positions can be determined using one of the methods described with reference to FIG. 10 or 11. In a particular embodiment, the as-built positions can be determined using one or more of the calibration systems described with reference to FIGS. 3-9. For example, determining the first as-built position and the second as-built position may include, at 1204, installing a first set of laser targets on the first wing, and, at 1206, installing a second set of laser targets on the second wing. The method may also include, at 1208, determining relative positions of the first set of laser targets and the second set of laser targets using a plurality of laser measurement devices. The laser measurement devices may include one or more of the buttline laser device, the right-side laser device, or the left-side laser device discussed with reference to FIGS. 4-7, or other laser measurement devices adapted to determine direction and distance to the laser targets. The method may also include, at 1210, determining the first as-built position and the second as-built position based on the relative positions of the first set of laser targets and the second set of laser targets. The as-built positions may include installation information related to the wing, such as the location or orientation of the wing, as well as information about the wing itself, such as geometry or configuration of the wing. For example, the first as-built positions may include a sweep angle of one or both of the wings. In another example, the as-built positions may include an angle of incidence of one or both of the wings. In yet another example, the as-built positions may include a dihedral angle of the wings. That is, the method may include, at 1212, determining a dihedral angle of the wings based on the first as-built position and the second as-built position.

The method also includes, at 1214, generating an aerodynamic representation of the aircraft using the first as-built position and the second as-built position. For example, the aerodynamic representation may include a computational fluid dynamics model of the aircraft. The aerodynamic representation may be adapted to determine aerodynamic properties of the aircraft based on the as-built positions. For example, the aerodynamic representation may be used to estimate drag associated with the aircraft at various operating conditions based on the as-built positions.

The method also includes, at 1216, determining an installation location of an aircraft component to reduce drag of the aircraft based on the aerodynamic representation. For example, an installation location of a horizontal stabilizer or vertical stabilizer may be determined to reduce aerodynamic drag that may result from the installation location of either or both of the wings. The method further includes, at 1218, installing the aircraft component at the installation location. By installing the aircraft component at the determined installation location, overall drag of the aircraft may be reduced resulting in significant cost savings. Additionally, time required to adjust trim settings associated with various control surfaces, such as flaps, ailerons, elevators and rudders may be reduced by adjusting the control surfaces based on the as-built positions and the aerodynamic representation.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, claimed subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method, comprising:
   installing a first plurality of sets of laser targets on a plurality of portions of a wing of an aircraft, wherein each of the first plurality of sets of laser targets includes an upper laser target installed on an upper side of the wing and a lower laser target installed on a lower side of the wing at a known location relative to the upper laser target;
   determining a first position of the upper laser target of each of the plurality of sets of laser targets using a first laser device;
   determining a second position of the lower laser target of each of the plurality of sets of laser targets using a second laser device; and
   determining a position of the wing based on the first position of the upper laser target of each of the plurality of sets of laser targets and the second position of the lower laser target of each of the plurality of sets of laser targets.

2. The method of claim 1, wherein determining the position of the wing includes:
   determining a location of the wing; and
   determining an orientation of the wing.

3. The method of claim 1, further comprising performing a comparison of the position of the wing and an expected position of the wing and adjusting the wing based on the comparison.

4. The method of claim 1, further comprising:
   performing aerodynamic modeling based on the determined position of the wing; and
   determining, based on the aerodynamic modeling, an installation position of a second aircraft surface to reduce aircraft drag.

5. The method of claim 1, further comprising:
   determining a first relative position of the first laser device with reference to a scale device mounted independently of aircraft surfaces, the scale device including a plurality of scale laser targets; and
   determining a second relative position of the second laser device with reference to the scale device including the plurality of scale laser targets.

6. The method of claim 1, further comprising:
   installing a second plurality of sets of laser targets on a second wing, wherein each of the second plurality of sets of laser targets includes an upper laser target and a lower laser target, wherein the upper laser target is installed on an upper side of the second wing and the lower laser target is installed on a lower side of the second wing at a known location relative to the upper laser target;
   determining positions of each laser target of the second plurality of sets of laser targets using the first laser device and the second laser device; and determining a position of the second wing based on the positions of each laser target of the second plurality of sets of laser targets.

7. The method of claim 6, further comprising:

installing a third plurality of sets of laser targets on a tail surface of the aircraft, wherein each of the third plurality of sets of laser targets include a third laser target and a fourth laser target, wherein the third laser target is installed on a first side of the tail surface and the fourth laser target is installed on a second side of the tail surface at a known location relative to the third laser target;

determining positions of the laser targets of the third plurality of sets of laser targets using the first laser device and the second laser device; and adjusting a position of the tail surface based on the position of the first wing, the position of the second wing and the positions of the laser targets of the third plurality of sets of laser targets.

8. The method of claim 1, wherein the lower laser target is coupled to an inclinometer and the lower laser target is installed on a moveable portion of the wing, the method further comprising adjusting the moveable portion of the wing after installing the lower laser target, based on readings from the inclinometer.

9. A calibration system, comprising:
a first laser target;
a second laser target;
at least one mounting coupler to secure the first laser target to a first side of an aircraft surface and to secure the second laser target to a second side of the aircraft surface;
an alignment device to enable installation of the second laser target on the second side of the aircraft surface at a known location relative to the first laser target; and
an inclinometer coupled to the second laser target to measure an angle of a movable portion of the aircraft surface.

10. The calibration system of claim 9, wherein the alignment device comprises:
a calibration laser physically coupled to the first laser target;
a calibration laser target coupled to the second laser target; and
an alignment filter between the calibration laser and the calibration laser target, wherein, when the second laser target is at the known location relative to the first laser target, the calibration laser shines on the calibration laser target through the alignment filter.

11. A method, comprising:
installing a first set of laser targets on a first wing of an aircraft;
installing a second set of laser targets on a second wing of the aircraft;
determining relative positions of the first set of laser targets and the second set of laser targets using a plurality of laser measurement devices;
determining a first position of the first wing of the aircraft and determining a second position of the second wing of the aircraft from the relative positions of the first set of laser targets and the second set of laser targets;
generating an aerodynamic representation of the aircraft using the first position and the second position; and
determining an installation location of an aircraft component to reduce drag of the aircraft based on the aerodynamic representation.

12. The method of claim 11, wherein the aerodynamic representation comprises a computational fluid dynamics model of the aircraft.

13. The method of claim 11, further comprising installing the aircraft component at the installation location.

14. The method of claim 11, wherein the aircraft component includes at least one of a horizontal stabilizer and a vertical stabilizer.

15. The method of claim 11, wherein the first position includes a sweep angle of at least one of the first wing and the second wing.

16. The method of claim 11, wherein the first position includes an angle of incidence of at least one of the first wing and the second wing.

17. The method of claim 11, wherein determining the first position of the first wing of the aircraft and determining the second position of the second wing of the aircraft comprises determining a dihedral angle of the first wing and the second wing.

18. The calibration system of claim 9, wherein the first laser target, the second laser target, the at least one mounting coupler, the alignment device, and the inclinometer are incorporated within a single calibration device.

* * * * *